United States Patent [19]

Oda

[11] Patent Number: 5,181,101
[45] Date of Patent: Jan. 19, 1993

[54] IMAGE SENSING APPARATUS

[75] Inventor: Kazuya Oda, Tokyo, Japan

[73] Assignee: Fuji Photo Film Co., Ltd., Kanagawa, Japan

[21] Appl. No.: 822,655

[22] Filed: Jan. 21, 1992

[30] Foreign Application Priority Data

Jan. 21, 1991 [JP] Japan ................................ 3-005254

[51] Int. Cl.$^5$ ............................................ H04N 9/04
[52] U.S. Cl. ........................................ 358/41; 358/43
[58] Field of Search .............. 358/41, 43, 44, 184, 358/213.24, 47

[56] References Cited

U.S. PATENT DOCUMENTS 5,113,245 5/1992 Oda ...................................... 358/41

Primary Examiner—Tommy P. Chin
Assistant Examiner—Minsun Oh

[57] ABSTRACT

Disclosed herein is an image sensing apparatus using a charge-coupled device of a frame interline-transfer system (FIT-CCD). The image sensing apparatus basically comprises the charge-coupled device, a sample/hold circuit, a signal processing circuit, a recording circuit, a driver circuit for setting a light-detecting unit in operation, a driver circuit for setting a storage unit in operation, a driver circuit for setting a horizontal charge transfer path in operation, a timing pulse generating circuit, an electronic shutter control circuit, a substrate voltage drive circuit, an overflow drain voltage circuit and an adding circuit. According to the above construction of the image sensing apparatus, any smear can greatly be reduced. It is therefore possible to greatly reduce flicker and to obtain a pseudo frame image superior in quality.

7 Claims, 5 Drawing Sheets

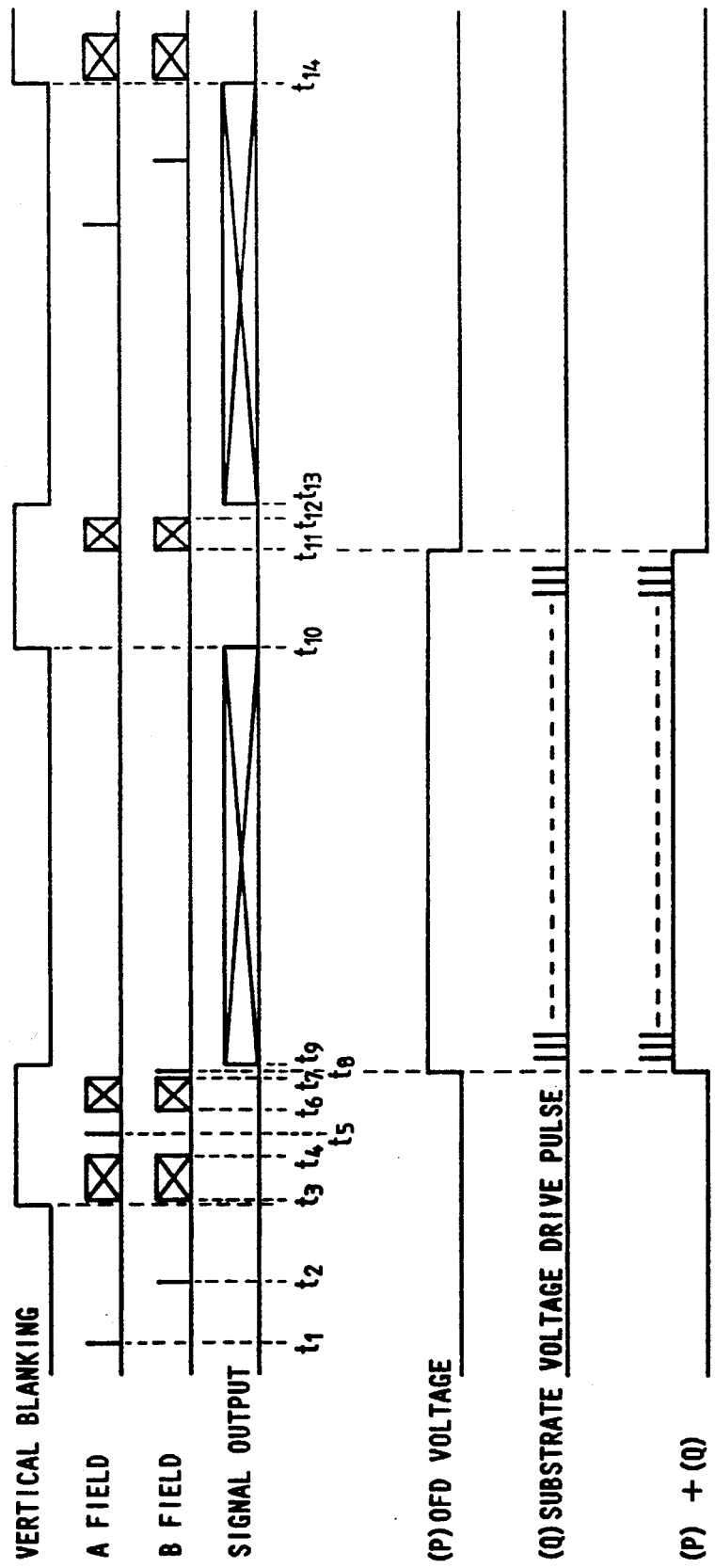

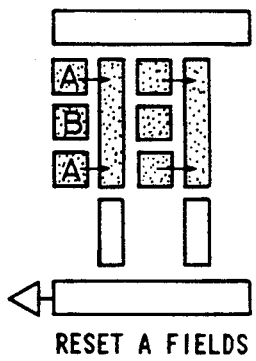
RESET A FIELDS
FIG.5(a)
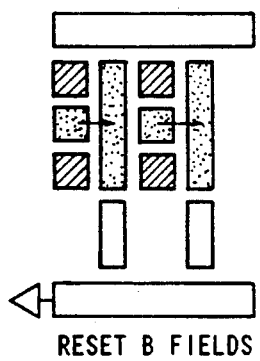
RESET B FIELDS
FIG.5(b)
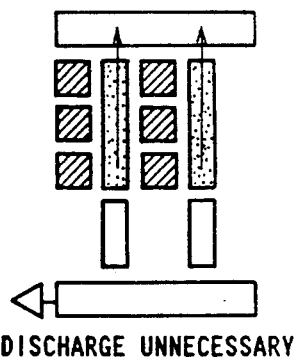
DISCHARGE UNNECESSARY ELECTRIC CHARGES
FIG.5(c)
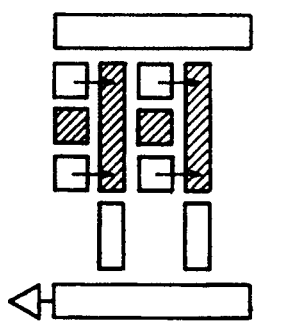
READ ELECTRIC CHARGES OF A FIELDS
FIG.5(d)
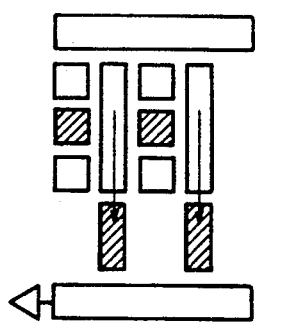
TRANSFER ELECTRIC CHARGES OF A FIELDS
FIG.5(e)
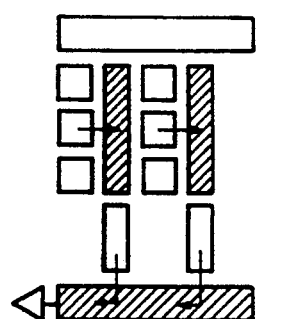
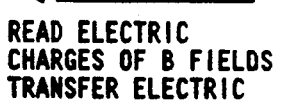
READ ELECTRIC CHARGES OF B FIELDS
TRANSFER ELECTRIC CHARGES OF A FIELDS
FIG.5(f)
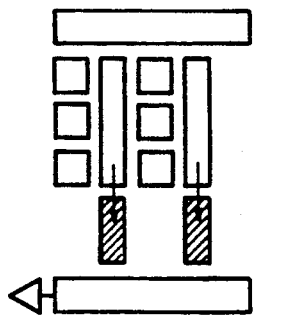
TRANSFER ELECTRIC CHARGES OF B FIELDS
FIG.5(g)
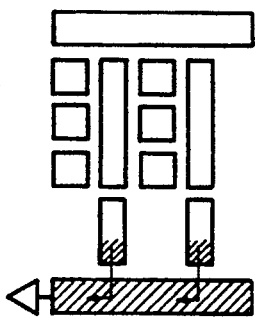
TRANSFER ELECTRIC CHARGES OF B FIELDS
FIG.5(h)

IMAGE SENSING APPARATUS

BACKGROUND OF THE INVENTION

1. Field of the Invention

The present invention relates to an image sensing apparatus using a charge-coupled device of a frame interline-transfer system (hereinafter referred to as an "FIT-CCD"), and more specifically to an image sensing apparatus capable of greatly reducing smears which occur in the FIT-CCD.

2. Description of the Related Art

There has heretofore been proposed a pseudo-frame imaging technique employed in an electronic still camera of a type wherein an FIT-CCD is used and its driving method is changed to photographically record a still picture.

In the above pseudo-frame imaging technique, however, signal charges of B fields should be allowed to remain in corresponding vertical charge transfer paths for about 1 V period (16.6 msec). Therefore, smears are produced so as to increase the electric charges of the B fields. As a result, there are produced differences in signal level between A and B fields, thereby producing so-called field flicker.

In order to reduce the field flicker, there have been proposed electrically-correcting methods such as a method of carrying out a gain modulation process for each field, a method of controlling exposure time of each of the A and B fields, etc. However, these correcting methods should be controlled for each shutter speed. Therefore, a systematic technique for controlling each of the correcting methods is complicated and sufficient space for disposing a correction circuit is required, thereby encountering difficulties in accommodating the correction circuit in the electronic still camera which has been under demand for the reduction in size.

SUMMARY OF THE INVENTION

It is a principal object of the present invention to provide an image sensing apparatus using a charge-coupled device of a frame interline-transfer system, of a type wherein field flicker can be reduced by preventing smears from being produced, thereby making it possible to obtain a pseudo-frame image superior in quality.

It is another object of the present invention to provide an image sensing apparatus at least comprising a charge-coupled device of a frame interline-transfer system, a sample and hold circuit for sampling image information output from the charge-coupled device, a signal processing circuit for subjecting a signal output from the sample and hold circuit to a predetermined process so as to output a luminance signal and a color difference signal therefrom, a recording circuit for recording the luminance signal and the color difference signal output from the signal processing circuit on a recording medium, a driver circuit for driving a light-detecting unit including first and second fields, of the charge-coupled device and for generating signals used to transfer electric charges stored in a plurality of vertical charge transfer paths formed in the light-detecting unit to a storage unit, a driver circuit for driving the storage unit used to store therein the electric charges transferred from the vertical charge transfer paths and for generating signals used to transfer the electric charges to a horizontal charge transfer path, a driver circuit for driving the horizontal charge transfer path, the driver circuit being used to generate signals for transferring the electric charges transferred to the horizontal charge transfer path to the sample and hold circuit, a timing pulse generating circuit for supplying a synchronizing signal to each of the signal processing circuit, the driver circuit for driving the light-detecting unit, the driver circuit for driving the storage unit, and the driver circuit for driving the horizontal charge transfer path, an electronic shutter control circuit for generating a control signal corresponding to the shutter speed therefrom, a substrate voltage drive circuit for generating an electronic shutter pulse signal based on the control signal output from the electronic shutter control circuit, an overflow drain voltage circuit for generating a direct current bias voltage used for the overflow drain, and an adding circuit for adding the level of the electronic shutter pulse signal generated from the substrate voltage drive circuit and the level of the direct current bias voltage generated from the overflow drain voltage circuit.

It is a further object of the present invention to provide an image sensing apparatus wherein the predetermined process of the signal processing circuit includes a white balance adjustment and a $\gamma$ correction.

It is a still further object of the present invention to provide an image sensing apparatus wherein the overflow drain voltage circuit is activated to apply a direct current bias voltage to an N-SUB substrate of the charge-coupled device.

It is a still further object of the present invention to provide an image sensing apparatus wherein the overflow drain voltage circuit is activated to generate a desired direct current bias voltage during a horizontal blanking period after signal charges of the second field have been read to be transferred to respectively corresponding vertical charge transfer paths.

It is a still further object of the present invention to provide an image sensing apparatus wherein the substrate voltage drive circuit is activated to generate a plurality of electronic shutter pulse signals to be applied to the N-SUB substrate of the charge-coupled device.

It is a still further object of the present invention to provide an image sensing apparatus wherein the substrate voltage drive circuit is operated to generate a desired voltage during the horizontal blanking period after the signal charges of the second field have been read to be transferred to the respectively corresponding vertical charge transfer paths.

It is a still further object of the present invention to provide an image sensing apparatus wherein the adding circuit is activated to apply the output thereof to the N-SUB substrate of the charge-coupled device.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 4 is a timing chart for describing the operation of the image sensing apparatus shown in FIG. 1;

FIG. 5 is a view for describing the operation of the charge-coupled device depicted in FIG. 2.

DETAILED DESCRIPTION OF THE PREFERRED EMBODIMENTS

Figure 1:
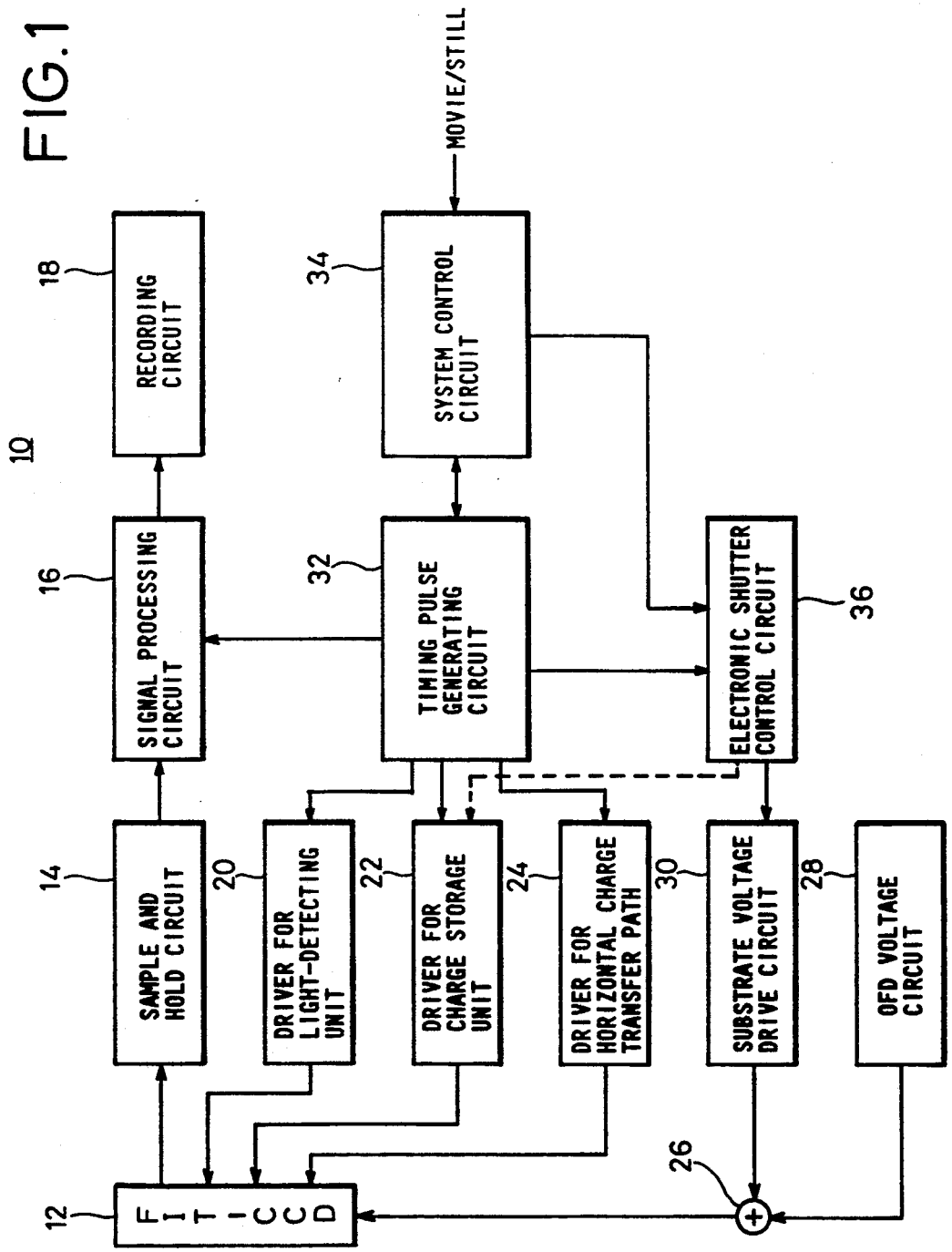
FIG. 1 is a block diagram showing the configuration of an image sensing apparatus according to one embodiment of the present invention.

FIG. 1 shows the structure of an image sensing apparatus embodying the present invention. In the same drawing, numeral 10 indicates an image sensing apparatus, which basically comprises a charge-coupled device of a frame interline-transfer system (hereinafter called an "FIT-CCD"), which is provided with a stripe-shaped color filter formed on a light-detecting surface on which an optical image of an object is focused, a sample and hold circuit 14 for sampling a color signal output from the FIT-CCD 12 in a correlation double sampling system, a signal processing circuit 16 for subjecting the output signal of the sample and hold circuit 14 to a white balance adjustment, a γ correction, etc. so as to output a luminance signal and a color difference signal therefrom, and a recording circuit 18 for recording the signals output from the signal processing circuit 16 on a recording medium.

The image sensing apparatus 10 comprises a driver 20 for driving, i.e., setting a light-detecting unit in operation, which is used to generate four-phase drive signals for driving vertical charge transfer paths of the FIT-CCD 12, a driver 22 for setting a charge storage unit in operation, which is used to generate four-phase drive signals for driving charge transfer paths of the storage unit in the FIT-CCD 12, a driver 24 for setting a horizontal charge transfer path in operation, which is used to generate two-phase drive signals for driving a horizontal charge transfer path of the FIT-CCD 12 and signals for controlling gates of the FIT-CCD 12, and an adding circuit 26. An OFD voltage circuit 28 for applying a direct current (d.c.) bias voltage used for an overflow drain (OFD) to the adding circuit 26 and a substrate voltage drive circuit 30 are electrically connected to the adding circuit 26.

In addition, the image sensing apparatus 10 includes a timing pulse generating circuit 32 for delivering a synchronizing signal to each of the signal processing circuit 16, the driver 22 and the driver 24 or the like, a system control circuit 34 for collectively controlling the entire operation of the image sensing apparatus 10, and an electronic shutter control circuit 36 for controlling the timing of an electronic shutter.

A description will now be made of the structure of the FIT-CCD 12 with reference to FIGS. 2 and 3.

Figure 2:
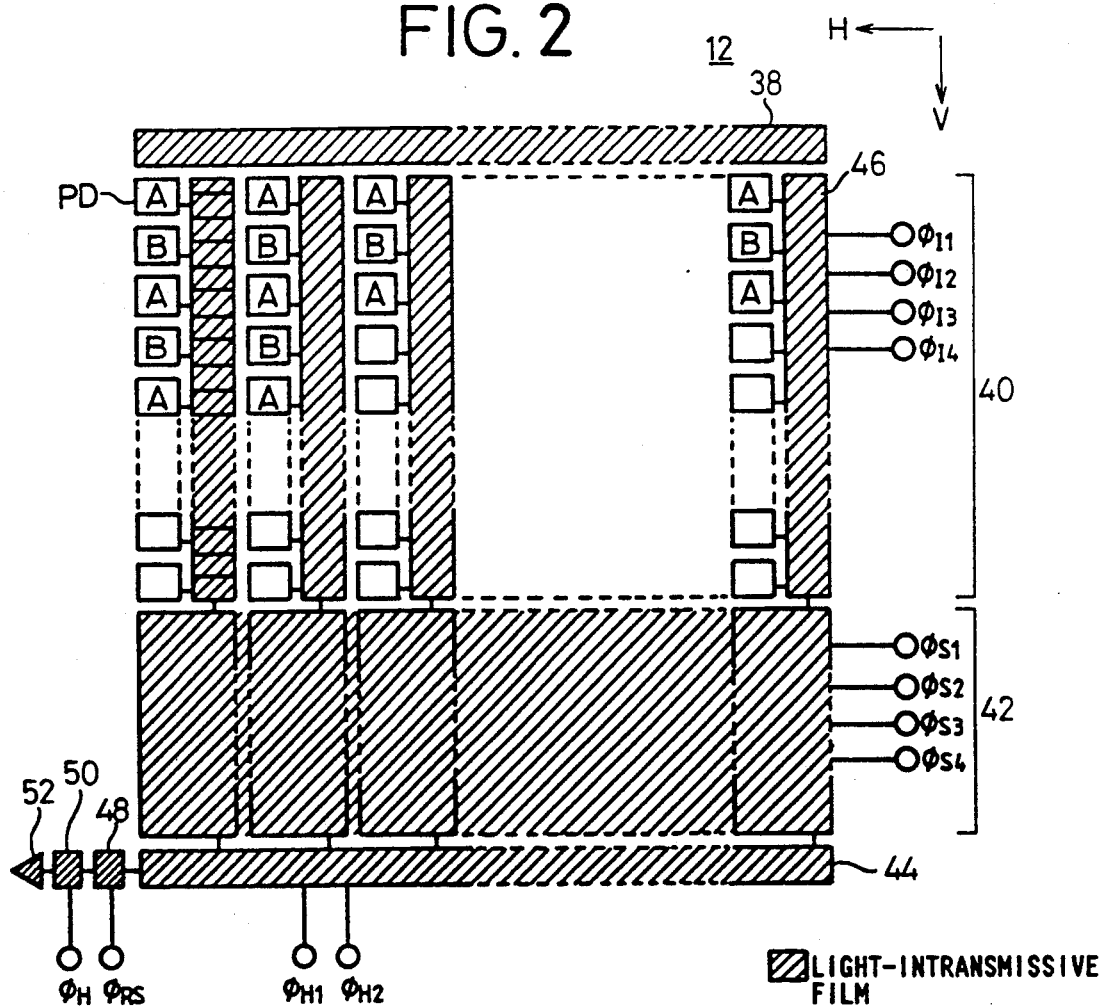
FIG. 2 is a transverse sectional view typically showing the structure of a charge-coupled device of a frame interline-transfer system shown in FIG. 1.
Figure 3:
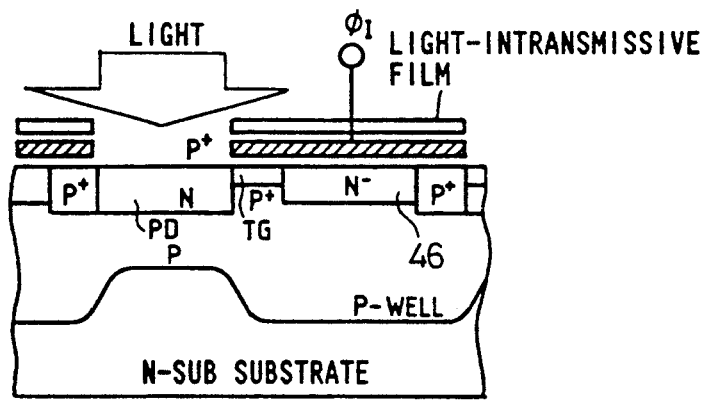
FIG. 3 is a vertical sectional view illustrating the structure of the charge-coupled device shown in FIG. 1.

FIG. 2 typically shows a transverse cross-section of the FIT-CCD 12. FIG. 3 typically illustrates a longitudinal cross-section of the FIT-CCD 12.

The FIT-CCD 12 comprises a drain section 38 for discharging unwanted or unnecessary electric charges, a light-detecting unit 40, a storage unit 42, a horizontal charge transfer path 44, etc.

The light-detecting unit 40 comprises a plurality of photodiodes PDs grouped into A and B fields, which are arranged in matrix form along vertical and horizontal directions V and H, respectively, a plurality of vertical charge transfer paths 46 for the transfer of electric charges, which are respectively formed adjacent to rows of the photodiodes PDs, and a plurality of transfer gates TGs respectively formed between the photodiodes PDs and the vertical charge transfer paths 46.

The storage unit 42 is formed with a plurality of charge transfer paths corresponding to the vertical charge transfer paths 46. Electric charges transferred from the vertical charge transfer paths 46 are stored in the respectively corresponding charge transfer paths arranged in alignment with the vertical charge transfer paths 46. The driver 22 is electrically connected to an unillustrated group of charge transfer electrodes formed on upper surfaces of the charge transfer paths of the storage unit 42.

The horizontal charge transfer path 44 serves to transfer to a reset gate 48, each of the electric charges delivered from the charge transfer paths of the storage unit 42. Thereafter, the electric charges thus delivered are transferred to the sample and hold circuit 14 through an output gate 50 and an output amplifier 52.

There are formed a plurality of light-intransmissive films on regions other than the storage unit 42 and the photodiodes PDs, i.e., upper surfaces of the horizontal charge transfer path 44 and the vertical charge transfer paths 46 or the like. The light-intransmissive films serve to render intransmissive of light incident on the respectively corresponding upper surfaces. There are also formed on the upper surfaces of the vertical charge transfer paths 46, a group of electrodes (not shown) for the transfer of electric charges.

The operation of the image sensing apparatus 10 constructed as described above will now be described below with reference to FIGS. 1 through 6.

When an unillustrated photography start switch is first operated, an actuating signal is applied to the system control circuit 34 of the image sensing apparatus 10. Thereafter, the timing pulse generating circuit 32 is activated in response to a control signal output from the system control circuit 34. Then, the driver 30 is operated in response to a timing pulse output from the timing pulse generating circuit 32 to transfer unnecessary electric charges stored in photodiodes PDs grouped into A fields to the corresponding vertical charge transfer paths 46 (see a time $t_1$ in FIG. 4 and see FIG. 5(a)).

Based on the same effect as that for the transfer of the unnecessary electric charges of the A fields, unnecessary electric charges stored in photodiodes PDs grouped in B fields are then transferred to the corresponding vertical charge transfer paths 46 (see a time $t_2$ in FIG. 4 and see FIG. 5(b)).

The unnecessary electric charges of the A and B fields, which have been transferred to the respectively corresponding vertical charge transfer paths 46, are discharged into the drain section 38 in accordance with a drive signal output from the driver 20 (see a time interval between times $t_3$ and $t_4$ and see FIG. 5(c)).

The photodiodes PDs grouped in the A fields, which have discharged the unnecessary electric charges at the time $t_1$, now store electric charges therein during a period from the times $t_1$ to $t_5$ shown in FIG. 4. The electric charges stored in the photodiodes PDs referred to above are transferred to the corresponding vertical charge transfer paths 46 at the timing of the time $t_5$ (see FIG. 5(d)).

In this case, electrodes of the transfer gates TGs for electrically connecting the photodiodes PDs to the corresponding vertical charge transfer paths 46 are formed integrally with transfer electrodes of the vertical charge transfer paths 46. Thus, when the driver 20 supplies a drive signal to each of the transfer electrode, each transfer gate TG is made conductive, so that the electric charges stored in the photodiodes PDs are transferred to the corresponding vertical charge transfer paths 46.

The electric charges of the A fields, which have been transferred to the vertical charge transfer paths 46 at the timing of the time $t_5$, are charges serving as image signals.

Then, the driver 20 supplies drive pulses of four phases, i.e., $\phi_{J1}$, $\phi_{J2}$, $\phi_{J3}$, $\phi_{J4}$ to the group of the electrodes of the vertical charge transfer paths 46 during a period from times $t_6$ to $t_7$. In addition, the driver 22 delivers drive signals of four phases, i.e., $\phi_{S1}$, $\phi_{S2}$, $\phi_{S3}$, $\phi_{S4}$ to the group of the transfer electrodes formed on the upper surfaces of the charge transfer paths of the storage unit 42. Thus, the charges delivered to the vertical charge transfer paths 46 in this way are transferred to the storage unit 42 (see FIG. 5(e)).

During a period from times $t_9$ to $t_{10}$, the FIT-CCD 12 is activated in response to the drive signals of four phases output from the driver 22 and drive signals of two phases, i.e., $\phi_{H1}$, $\phi_{H2}$ output from the driver 24 to supply the electric charges transferred to the storage unit 42 to the sample and hold circuit 14 through the reset gate 48, the output gate 50 and the output amplifier 52.

On the other hand, the electric charges are stored in the photodiodes PDs grouped in the B fields during a period from the times $t_2$ to $t_8$. Thereafter, the electric charges thus stored are transferred to the corresponding vertical charge transfer paths 46 under the control of the driver 20 at the timing of the time $t_8$ (see FIG. 5(f)). Then, the electric charges of the B fields transferred to the vertical charge transfer paths 46 are temporarily stored in the vertical charge transfer paths 46 during a period from the times $t_8$ to $t_{11}$ (one vertical deflecting period). During a period from the time $t_{11}$ to a time $t_{12}$, the electric charges stored in the vertical charge transfer paths 46 are transferred to the storage unit 42 (see FIG. 5(g)).

The FIT-CCD 12 is activated in response to the drive signals output from the drivers 22 and 24 to transfer the electric charges transferred to the storage unit 42 to the sample and hold circuit 14 during a period from times $t_{13}$ to $t_{14}$.

The electric charges stored in the photodiodes PDs are transferred to the sample and hold circuit 14 in accordance with the above-described operations. At this time, however, the electric charges of the B fields are held in the vertical charge transfer paths 46 during the period from the times $t_8$ to $t_{11}$. Therefore, unnecessary electric charges enter the vertical charge transfer paths 46 from the depth of a substrate of the FIT-CCD 12 or the like, so that a reproduced image is greatly deteriorated in quality.

A description will now be made of the unnecessary electric charges which enter the vertical charge transfer paths 46 with reference to FIG. 6.

Figure 6:
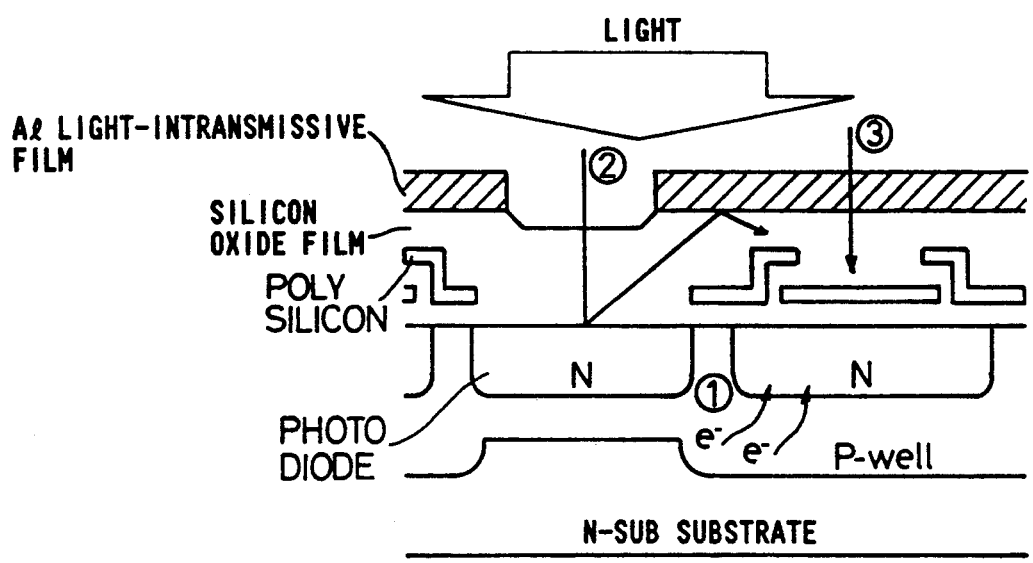
FIG. 6 is a view for describing the generation of smears in the charge-coupled device shown in FIG. 1.

Firstly, a part of electric charges produced by incident light is diffused into a P well so as to leak in the vertical charge transfer paths 46 (see FIG. 6 ①). Secondly, a part of light incident upon each photodiode PD is reflected from a surface of a silicon oxide film, and a portion of the reflected light is reflected again from a back surface of an aluminum (Al) light-intransmissive film, thereby leaking in the vertical charge transfer paths 46 (see FIG. 6 ②). Thirdly, the vertical charge transfer paths 46 are directly exposed to the light which has transmitted the Al light-intransmissive film so as to produce noise electric charges therein (see FIG. 6 ③).

The unnecessary electric charges, which leak in the vertical charge transfer paths 46 from the first entrance passage, of the unnecessary electric charges referred to above, are particularly called "smears". They have a great influence on the quality of a reproduced image, but the production rate of smears is affected by a change in the shutter speed.

Described specifically, let's now assume that the time (a time interval between the times $t_6$ and $t_7$) required to transfer electric charges to the storage unit 42 from the vertical charge transfer paths 46 is represented by X, and a period from the X to the following charge discharge time is represented by Y. In this case, the degree of the effect on the image quality by smears of pseudo fields can be represented by the following expression (percentage) when a shutter speed of 1/60 second is selected.

the production rate of smears $\times 2 \times$ (1/shutter speed)/60 $\times$ (Y/(X/10)

Assuming now that when the shutter speed is represented by, e.g., a generally-used 1/60 second, the production rate of smears is 0.0001%, the degree of the effect on the quality of the reproduced image can be represented as follows:

$0.0001 \times 2 \times (60/60) \times (16.27 \text{ msec}/(333 \ \mu\text{sec}/10)) = 0.09763\%$ Further, when the shutter speed is represented by 1/250 second, the degree of the effect upon the quality of the reproduced image can be represented as follows:

$0.0001 \times 2 \times (250/60) \times (16.27 \text{ msec}/(333 \ \mu\text{sec}/10)) = 0.4068\%$ Thus, the generation rate of the smears increases with increasing the shutter speed.

Now, the electric charges stored in the A fields are transferred to the vertical charge transfer paths 46 immediately after the unnecessary electric charges of the vertical charge transfer paths 46 have been discharged. Immediately after the electric charges have been transferred to the vertical charge transfer paths 46, they are further transferred to the storage unit 42 again. Therefore, the degree of the effect upon the quality of the reproduced image by the smears can greatly be reduced.

However, the electric charges stored in the B fields are transferred to the vertical charge transfer paths 46 immediately after the electric charges stored in the A fields have been transferred to the storage unit 42 from the vertical charge transfer paths 46. The electric charges stored in the B fields cannot therefore be transferred to the storage unit 42 during a period in which the electric charges stored in the A fields exist in the storage unit 42. Thus, the electric charges stored in the B fields are held in the vertical charge transfer paths 46 during a period approximate to one vertical deflecting period, so that the smears, i.e., the unnecessary electric charges which enter the vertical charge transfer paths 46, are greatly produced with respect to the B fields alone as compared with the A fields.

Further, when the shutter speed increases, the production rate of smears increases. Therefore, the difference in the rate of the smears produced between the A and B fields is increased. When the difference in the production rate of the smears obtained based on the above-described calculation reaches 1% or greater, flicker occurs in an reproduced image displayed on a CRT.

Thus, in order to prevent the generation of the smears which cause flicker to occur, the system control circuit 34 is activated to cause the OFD voltage circuit 28 to apply a d.c. bias voltage to an N-SUB substrate for the photodiode PDs through the adding circuit 26 (see FIG. 4(P)) during a horizontal blanking period (from the times $t_8$ to $t_{11}$ in FIG. 4) after signal charges of B fields have been read out to be transferred to vertical charge transfer paths, thereby causing the N-SUB substrate to absorb overflow drain developed in a P-WELL layer.

Further, after the signal charge of the B fields have been read to be transferred to the vertical charge transfer paths, the electronic shutter control circuit 36 is activated to cause the substrate voltage drive circuit 30 to input an electronic shutter pulse signal to the N-SUB substrate for the photodiode PDs through the adding circuit 26 (see FIG. 4(Q)) during the horizontal blanking period (from the times $t_8$ to $t_{11}$ in FIG. 4). Consequently, the part of the light incident upon each photodiode PD is reflected from the surface of the silicon oxide film, and the portion of the reflected light is reflected again from the back surface of the aluminum (Al) light-intransmissive film, so that the N-SUB substrate is allowed to absorb unnecessary electric charges which enter into the vertical charge transfer paths 46, and the N-SUB substrate is caused to absorb any overflow drain which occurs in the P-WELL layer.

Accordingly, the adding circuit 26 adds the output of the OFD voltage circuit 28 and the output of the substrate voltage drive circuit 30 to deliver the result of its addition to the FIT-CCD 12 (see (P)+(Q) in FIG. 4).

In this case, the electronic shutter control circuit 36 serves to supply a control signal corresponding to the shutter speed to the substrate voltage drive circuit 30. Thus, the substrate voltage drive circuit 30 makes the N-SUB substrate of the FIT-CCD 12 to conduct in accordance with the shutter speed.

According to the present embodiment, as has been described above, the d.c. bias voltage for the overflow drain and the electronic shutter pulse signal are supplied to the FIT-CCD 12 during the horizontal blanking period so as to cause the N-SUB substrate to absorb the smears or the like which occur in the depth of the substrate of the FIT-CCD 12. As a result, the smears which enter into the vertical charge transfer paths 46 can greatly be reduced, thereby making it possible to obtain a satisfactory pseudo frame image.

Having now fully described the invention, it will be apparent to those skilled in the art that many changes and modifications can be made without departing from the spirit or scope of the invention as set forth herein.

What is claimed is:

1. An image sensing apparatus at least comprising:
   a charge-coupled device of a frame interline-transfer system;
   a sample and hold circuit for sampling image information output from said charge-coupled device;
   a signal processing circuit for subjecting a signal output from said sample and hold circuit to a predetermined process so as to output a luminance signal and a color difference signal therefrom;
   a recording circuit for recording the luminance signal and the color difference signal output from said signal processing circuit on a recording medium;
   a driver circuit for driving a light-detecting unit including first and second fields, of said charge-coupled device and for generating signals used to transfer electric charges stored in a plurality of vertical charge transfer paths formed in said light-detecting unit to a storage unit;
   a driver circuit for driving said storage unit used to store therein the electric charges transferred from said vertical charge transfer paths and for generating signals used to transfer the electric charges to a horizontal charge transfer path;
   a driver circuit for driving said horizontal charge transfer path, said driver circuit being used to generate signals for transferring the electric charges transferred to said horizontal charge transfer path to said sample and hold circuit;
   a timing pulse generating circuit for supplying a synchronizing signal to each of said signal processing circuit, said driver circuit for driving the light-detecting unit, said driver circuit for driving said storage unit, and said driver circuit for driving said horizontal charge transfer path;
   an electronic shutter control circuit for generating a control signal corresponding to the shutter speed therefrom;
   a substrate voltage drive circuit for generating an electronic shutter pulse signal based on the control signal output from said electronic shutter control circuit;
   an overflow drain voltage circuit for generating a direct current bias voltage used for the overflow drain; and
   an adding circuit for adding the level of the electronic shutter pulse signal generated from said substrate voltage drive circuit and the level of the direct current bias voltage generated from said overflow drain voltage circuit.

2. An image sensing apparatus according to claim 1, wherein said predetermined process of said signal processing circuit includes a white balance adjustment and a $\gamma$ correction.

3. An image sensing apparatus according to claim 1, wherein said overflow drain voltage circuit is activated to apply said direct current bias voltage to an N-SUB substrate of said charge-coupled device.

4. An image sensing apparatus according to claim 3, wherein said overflow drain voltage circuit is activated to generate a desired one of said direct current bias voltage during a horizontal blanking period after signal charges of said second field have been read to be transferred to respectively corresponding vertical charge transfer paths.

5. An image sensing apparatus according to claim 1, wherein said substrate voltage drive circuit is activated to generate a plurality of said electronic shutter pulse signals to be applied to the N-SUB substrate of said charge-coupled device.

6. An image sensing apparatus according to claim 5, wherein said substrate voltage drive circuit is operated to generate one of said electronic shutter pulse signals during the horizontal blanking period after the signal charges of said second field have been read to be transferred to the respectively corresponding vertical charge transfer paths.

7. An image sensing apparatus according to claim 1, wherein said adding circuit is activated to apply the output thereof to the N-SUB substrate of said charge-coupled device.

* * * * *